UNITED STATES PATENT OFFICE.

FRIEDRICH BÖLLING, OF FRANKFORT-ON-THE-MAIN, GERMANY, ASSIGNOR OF ONE-HALF TO CHEMISCH-ELECTRISCHE FABRIK PROMETHEUS G. M. B. H., OF FRANKFORT-ON-THE MAIN, GERMANY.

PROCESS FOR THE PRODUCTION OF ELECTRIC RESISTANCE BODIES.

No. 864,723.　　　Specification of Letters Patent.　　　Patented Aug. 27, 1907.

Application filed December 29, 1904. Serial No. 238,856.

*To all whom it may concern:*

Be it known that I, FRIEDRICH BÖLLING, engineer, a subject of the King of Prussia, residing at Frankfort-on-the-Main, Bockenheim, Germany, have invented new and useful Improvements in Processes for the Production of Electric Resistance Bodies, of which the following is a specification.

The present invention relates to a process for the production of electrical resistances from carbid of silicon or from carbid of boron or from siloxicon or from similar materials and consists in converting the material into a coherent mass at a temperature below its melting point, which mass possesses a relatively high electrical resistance and porous nature.

It has been proposed to produce resistance bodies, consisting of metallic carbids to which in case of need additions of non-conducting oxids were added for the purpose of increasing the resistance by fusing them together by means of the electric current. The formation, however, of these resistance bodies by melting in electrical furnaces is itself a difficult process. Then there occurs the further drawback that the resistance bodies obtained by melting can only be shaped with great difficulty if at all owing to their extreme hardness. But for the proper application of these resistance bodies, the shape or the shaping thereof is of very great importance. Consequently the very limited application of the molten carbid bodies hitherto known is found to be a great drawback. Further it is to be observed that resistance bodies of metallic carbids may find a very varied application in electrical industries. They may be applied for instance as resistances for regulating apparatuses, for starting mechanisms and so forth with the special advantage that they may be greatly overloaded without injury.

The crystals of carbid of silicon are conductors of electricity as is well known. The problem is therefore to collocate these crystals so closely and firmly together and so unite them that the body formed thus is a unitary conducting body. This can be effected for instance in the following manner. Carborundum or another carbid is brought into an electric furnace, the temperature whereof is below that of the production temperature of the said carbid. For the obtaining of the necessary temperature the well known electric furnace is particularly suitable in which two carbon electrodes are connected by means of a thin carbon pencil acting as a resistance. After the electric current has acted for a certain time upon the material, the latter bakes together and is converted into a conducting material of porous nature.

Instead of converting the material by the influence of the electric current into the form of current conductors, this could be effected in any other suitable manner, the essence of the present invention being the formation of current conducting bodies from carbids or corresponding raw materials, without heating them to their fusing point.

In order to increase the mechanical strength of the bodies they may be dipped in enamel and then fired in a suitable furnace. This secondary treatment may in certain cases be avoided by adding to the finely pulverized raw material, suitable materials from the commencement for the purpose of still more firmly cementing the crystals together. Suitable for this purpose is artificial corundum or a similar material having a high fusing point. The addition of any of such materials has however the disadvantage, that the fusing point of the resistance bodies is reduced, for there are few materials that will stand such high temperature, without softening or fusing, as carborundum and conducting bodies of pure carbid which will withstand temperatures up to about 2000 centigrades without softening, while by an addition of 10% corundum the fusing point is reduced to about 1500 centigrades. A further disadvantage of such binding materials is that the resistance in most cases becomes too high for some purposes.

It is further understood that this invention is not limited to using only one of the materials, but also the carbids themselves or the carbid with siloxicon may be mixed together, in order to increase the resistance where it is desired, siloxicon being a composition of carbon, silicon and oxygen, having a somewhat higher resistance apparently than the carbids.

A specially suitable form of the new resistance bodies is obtained when there is added to the raw materials a material suitable for preventing the oxidation of the individual crystals, such as boracic acid serving as a deoxidizing agent and binding material, the mass being then pressed together under strong pressure and finally fired at a high temperature of about 800—1200 centigrades but below its melting point.

In a test nine grams of crystals of silicon carbid and one gram of boracic acid were mixed together, the mass then pressed and fired at about 1200 centigrades. The product showed such a good conductivity that a body of 80 mm length and 8 by 8 mm section could be utilized for a tension of 72 volts.

By this process can be produced smooth resistance bodies which are conducting over their entire surface.

The boracic acid or any other material of the same nature is added for the purpose of preventing the crystals from oxidation. It is a well known fact that if crystals of carborundum, when fired in a kiln or other furnaces with access of the air, are covered by a thin film of oxid, which being a non conductor of electricity would prevent that the crystals may conduct the current even when said crystals are brought close together.

The boracic acid used according to the invention serves not only as a deoxidizing agent and binding material, but especially for the augmentation of the conductivity. Further it presents the important advantage that the strength of the body and its hardness are fully sufficient for the requirements of practical utility, while it is not impossible to bore holes for contacts in the resistance bodies after they are fired or for connecting them to their conductors. The bodies thus produced by the use of boracic acid or some suitable deoxidizing and binding material have always the same uniform composition, an advantage which is not obtained in the carbid bodies previously known made of mixtures and obtained by fusing, because at the great heat necessary for fusing them a portion of the materials added is volatilized.

The resistance bodies produced according to the present invention possess a considerably greater resistance than the molten metallic carbids, because the individual crystals of the latter only touch one another at a limited number of points, whereas the new resistance bodies form a compact mass which is a good conductor of electricity owing to the fact, that the crystals are well cemented together.

Resistance bodies produced according to the present invention may have many various forms, as for instance blocks, disks, long bars of round or angular section, tubes, and so forth. They can be applied to the most widely different purposes as for resistances for regulating and starting purposes, or for resistances for arc lamps for which purpose they can be arranged in the lamp owing to their high resistance combined with a small volume. For regulating resistances the bodies may be formed in the shape of rings which are cut open and have the contact spring sliding upon them. For regulating purposes the contact spring can also be allowed to slide directly upon a straight rod. The new resistance bodies can also be applied as heating resistances in those cases in which a glowing temperature is to be used. They are suitable also as heaters for Nernst lamps because they can be easily produced on a large scale in very small dimensions and with a high resistance. Further they are suitable as resistances for heating lamps in which a moderate glowing temperature is of more importance than a great supply of light. Moreover a vacuum is not essential in this case.

The new resistance bodies produced with boracic acid can be applied for temperatures up to 800 centigrades but at higher temperatures they become soft so that in this respect they are inferior to those made of carbids without binding material or with a silicified carbon bond. On the other hand they possess the important advantage that for their production much cheaper raw materials can be employed because the amorphous carborundum which is used is obtained as a by-product.

An addition of volatile matter to the resistance bodies, formed according to this invention, may be made, in order to increase their porosity. The bodies then have to be fired in an open furnace with access of air in order that the volatile matter such as saw-dust for instance can burn out.

Having now described my invention and in what manner the same is to be performed, what I claim and desire to secure by Letters Patent is:

1. The herein described process for producing electric resistance bodies, which consists in molding and pressing pulverulent carbid of silicon, into the form desired and subjecting it to a temperature at which the carbid only becomes soft enough, that its particles bake together and form a unitary body, substantially as described.

2. The herein described process for producing electric resistance bodies which consists in molding and pressing a mixture of carbid of silicon and boracic acid into the form desired and subjecting it to a temperature at which the mixture only becomes soft enough that its particles bake together and form a unitary body, substantially as described.

In testimony whereof I have signed my name to this specification in the presence of two subscribing witnesses.

FRIEDRICH BÖLLING.

Witnesses:
JEAN GRUND,
CARL GRUND.